July 1, 1952     J. CUFF     2,601,738

MINNOW BUCKET

Filed May 10, 1948

James Cuff
INVENTOR.

BY *James A. O'Brien*
*and Harvey B. Jacobson*
Attorneys

UNITED STATES PATENT OFFICE 2,601,738

MINNOW BUCKET

James Cuff, Mabelvale, Ark., assignor of one-third to Jack Cuff and one-third to Fred Cuff, Mabelvale, Ark.

Application May 10, 1948, Serial No. 26,110

1 Claim. (Cl. 43—57)

The present invention relates to certain new and useful improvements in minnow buckets of the so-called aerated types in which minnows and the like may be kept alive while they are being transported from place to place, for instance from one's home to a not-too-distant fishing ground.

As the introductory statement of the invention makes clear, I am aware that the art to which the invention relates has to do with many and varied types of aerated live bait carrying buckets and containers. In addition, it is common to provide means whereby suction may be created within the confines of the container, the suction being sufficient to "pull" air from the outside into the container to bubble up through the water in a manner to satisfactorily aerate and condition the water.

It is also old in the art to provide aerated minnow buckets wherein a hose is connected with the bucket and, also, with an automobile windshield wiper or the intake manifold for purposes of inducing the necessary suction in the water-containing bucket.

In cases where the suction is taken from either the windshield wiper or intake manifold, it sometimes happens that the "pull" of the suction will also suck water into the suction line and carry it accidentally into the windshield wiper or intake manifold, and this is objectionable. Therefore, it is an object of the present invention to so attach the suction producing line to the water containing minnow bucket that undesired water is trapped and thus prevented from being drawn back into the windshield wiper or intake manifold, as the case may be.

More specifically, novelty is predicated on the adoption and use of a simple water trap which takes the form of an inverted glass jar, the latter being mounted atop the vented lid of a bait bucket by way of a screw-cap secured to said lid. A U-shaped suction pipe is provided and the bight portion thereof is mounted in the bucket with one branch or end portion extending to the exterior of both jar and bucket by way of the lid. This end accommodates a suction hose, and the other branch or end portion extends up through the lid into the jar chamber and has its upper end isolated in the extreme upper portion of the jar chamber. A second pipe has its intermediate portion mounted in said lid with its lower end portion depending into said bucket and its upper end portion projecting into said chamber and terminating on a plane well below the isolated upper end of said U-shaped pipe. What with the aid of a third pipe having upper and lower end portions situated in the jar chamber and bucket, respectively, this having overflow port means, the over-all construction is made to work adequately and satisfactorily.

Other objects, features and advantages will become more readily apparent from the following description and drawings.

In the sheet of drawings, wherein like numerals are employed to designate like parts throughout the views.

Figure 1:
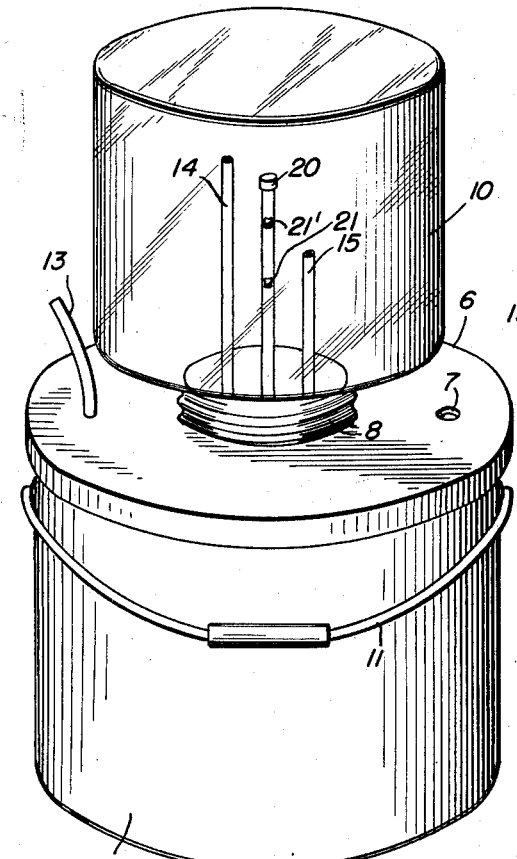
Figure 1 is a perspective view, showing a minnow bucket and jar arrangement constructed in accordance with the principles of the present invention.
Figure 2:
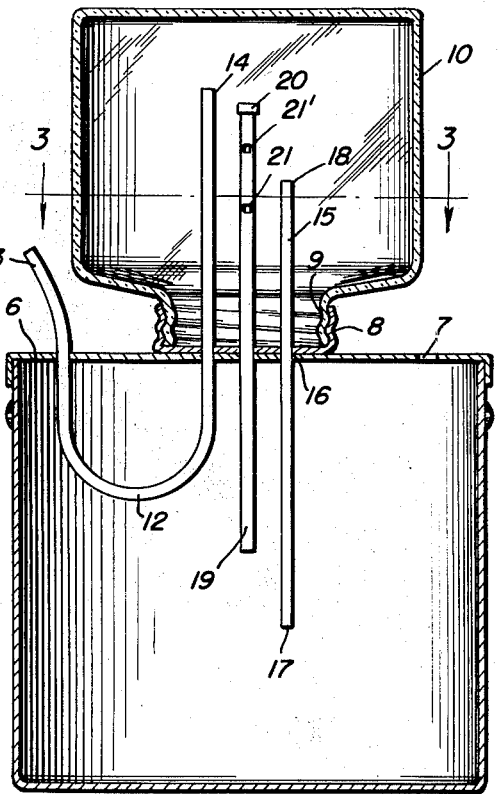
Figure 2 is a vertical sectional view, with parts in elevation, taken on the line 2—2 of Figure 3.
Figure 3:
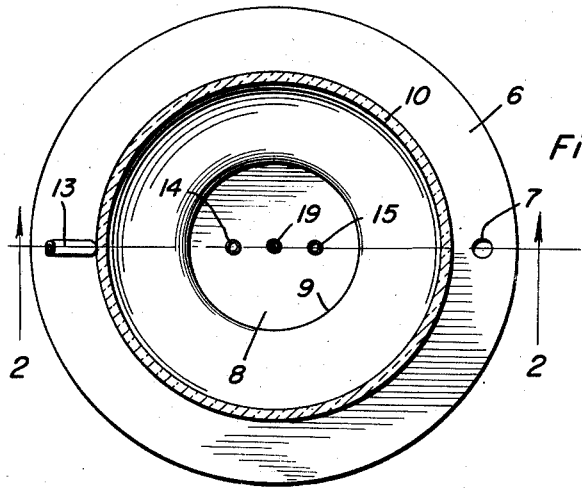
Figure 3 is a horizontal section, on the line 3—3 of Figure 2, looking in the direction of the arrows.

Referring now to the drawings by distinguishing reference numerals, the minnow bucket proper is denoted by the numeral 5 and is of appropriate material and capacity. The open top of the bucket is closed by a suitably flanged lid or cover 6, having an air intake port 7 at an appropriate point of location. Centered and secured on the top side of the lid is an upside-down screw cap 8 and a screw-threaded neck 9 of a glass jar 10 is screwed into said cap. The jar is approximately one gallon capacity. The numeral 11 designates an appropriate carrying bail or handle.

A substantially U-shaped suction pipe is provided and denoted by the numeral 12, and this has its main portion located in the upper portion of the bucket and has one branch extending up through and outwardly beyond the lid, and terminating as at 13 to accommodate a suction hose (not shown) from a windshield wiper or other source of suction.

The U-shaped pipe also has a straight vertical and longer branch 14, and this extends through the lid 6, cap 8 and by way of the neck 9, up into the upper portion of the jar 10. Thus, the point at which suction is created in the jar 10 is at the exit end 14.

The numeral 15 designates a vertical air and water conducting tube or pipe. This is a straight length of pipe which is secured in place intermediate its ends as at 16, and the lower end depends into the water-filled minnow bucket 5. The air intake end of said pipe is denoted at 17 and the upper discharge end at 18, the latter emptying into the main suction chamber of the jar 10.

The numeral 19 represents an overflow and equilibrium establishing pipe which is also straight and whose lower end depends into the water space of the bucket. The upper end extends into the jar and is provided with a closing cap 20. The upper end portion, below said cap 20, is also provided with restricted water return slots or slits 21 and 21'.

In practice, the minnow bucket 5 is substantially filled with water and charged with minnows or other live bait. The bucket is usually placed on the floor of an automobile, somewhere within convenient reach of the occupants of the front seat. Then, a hose (not shown) is attached to the end 13 of the suction pipe 12. The hose is connected at its opposite end to an intake manifold or a windshield wiper (not shown). When the hose is attached to the tube 12, suction is produced in the chamber of the glass jar 10 by way of the upper suction end 14 of the pipe 12. Obviously, when sufficient suction is accumulated in the space or chamber of the jar, it acts, primarily, on the tube end 18 and exerts a suction pull on the water in the minnow bucket which is sufficient to draw air into the water, by way of the fresh air inlet orifice or port 7. The "pull" thus produced will, of course, be bound to draw a certain amount of air and water up into the jar through both pipes 15 and 19. The water will continue to rise in jar 10 until it reaches the level of the restricted return slit 21 which, it will be noted, is on a level below the pipe-end 18 and the venting slit 21', which is above said end 18, whereupon a state of equilibrium is reached and no more air and water is drawn into the jar by either of the pipes 15 and 19. It will be noted, in this connection, that the suction creating end 14 is above any water level that might be normally obtained by the water which is trapped in the jar, so that suction can be produced above the head of the water column. Therefore the level of the latter is never sufficient to overflow into the end 14 of the pipe 12. Consequently, water will not be accidently carried back by suction through pipe 12 and into the windshield wiper or engine as the case may be.

The gist of the invention resides in isolating the end 14 of the pipe 12 in a suction type chamber which in the instant situation takes the form of a jar attached to and closed by the lid of a water containing bucket. Secondly, communication is afforded between the suction chamber in the jar and the water chamber in the bucket by a pipe with one end communicating with the suction chamber and the other end, the pipe 15, communicating with the water in the bucket. Third, a simple properly ported overflow pipe 19 coacts with the respective chambers of the bucket and jar to render the structure aptly operable.

It will be further understood that during the course of transporting minnows, the suction will not be "on" all the time. In other words, the suction hose will be hooked up with the pipe end 13, whenever thought necessary or desired and then, when sufficient air has been drawn into the water in the bucket to keep the bait alive, the hose will be detached.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention what is claimed as new is:

In a minnow bucket construction of the class described, a minnow bucket having a closing lid provided with a fresh air intake hole, an inverted screw-cap attached to the central top portion of said lid, an inverted glass jar having a chamber and a screw-threaded neck screwed into said screw-cap, a U-shaped suction producing pipe embodying branch portions and a connecting bight portion, said bight portion being mounted in said bucket, one of said branch portions extending upwardly through the lid to a position exteriorly of said jar and being adapted to accommodate a suction hose, the other branch portion extending upwardly through the lid and into the jar chamber and having its upper end terminating in close proximity to the upper end of the jar and thus isolated in the extreme upper portion of the jar chamber, and a second pipe having its intermediate portion mounted in said lid with a lower end portion depending into said bucket and an upper end portion projecting into said jar chamber and terminating on a plane well below the isolated upper end of the branch portion of said U-shaped pipe, and a third pipe, said second and third pipes being straight from end to end, being in spaced parallelism with each other and also with the adjacent branch portion of said U-shaped pipe, said third pipe having its intermediate portion mounted in said lid and having a lower end portion projecting into said bucket to a position below the bight portion and to a position above the lower end of the second pipe and having its upper end projecting into the chamber of said jar and provided with at least one restricted slot, said slot being on a plane below the upper end of said second pipe.

JAMES CUFF.

REFERENCES CITED

The following references are of record in the file of this patent:

UNITED STATES PATENTS

| Number | Name | Date |
|---|---|---|
| 1,767,324 | Tasker | June 24, 1930 |
| 2,007,326 | Carpenter | July 9, 1935 |
| 2,303,757 | Pierson | Dec. 1, 1942 |
| 2,489,818 | Roe | Nov. 29, 1949 |
| 2,493,952 | Eidson | Jan. 10, 1950 |